United States Patent Office 3,380,940
Patented Apr. 30, 1968

3,380,940
PROCESS AND MATERIAL FOR THE PREPARATION OF AN AQUEOUS SOLUTION FOR NEUTRALIZING AND PRE-GLUING BUILDING SURFACES
Werner Hansi, Wiesbaden, and Eduard Gramm, Wiesbaden-Biebrich, Germany, assignors to Kalle Aktiengesellschaft, Wiesbaden-Biebrich, Germany, a corporation of Germany
No Drawing. Filed Sept. 13, 1965, Ser. No. 487,077
Claims priority, application Germany, Sept. 16, 1964, K 54,020
12 Claims. (Cl. 260—15)

The present invention relates to a process and a material for the preparation of an aqueous solution for neutralizing and pre-gluing building surfaces.

Structural parts made from lime- or magnesia-containing material exhibit an alkaline reaction for a long time after fabrication. If the surfaces of such structural parts are to be provided with a decorative or protective coating or with wallpaper, the alkalinity of the parts often has an adverse effect, for example, spots occur or the colors change their shades. It is, therefore, often usual to treat the surfaces of structural parts manufactured from alkaline materials, such as masonry, fresh plaster, or building panels, with a solution having an acid reaction. Furthermore, it is often necessary to decrease the porosity of such building surfaces by forming a film on the surface which closes the pores more or less completely. Suitable film-formers are natural or synthetic glues, e.g. animal or vegetable glues, but cellulose ether is most commonly used today. In this application, as is also usual otherwise, this process is termed pre-gluing.

Solutions of salts of aluminum, chromium or zinc which have an acid reaction in an aqueous solution, and also salts of hydrofluorosilicic acid are generally employed to neutralize the alkalinity of surfaces of structural parts; solutions of alum or aluminum sulfate are used, for example. So-called painter's glues are used almost exclusively for pre-gluing; these usually are water-soluble derivatives of cellulose or starch. Neutralizing and pre-gluing generally are performed in two separate operations, i.e. in the one operation the surfaces are treated with an acid solution and in the other with a solution of the painter's glue. When using a solution of a salt of hydrofluorosilicic acid, a third operation, i.e. washing the surface after neutralization, is required. It is also known that neutralizing and pre-gluing can be performed in one operation if methyl cellulose or ethyl hydroxyethyl cellulose together with alum or aluminum sulfate is used as the painter's glue, but it is necessary for the preparation of the single solution to separately dissolve the two components, i.e. the cellulose ether and the salt, and then to combine the two solutions. When it is attempted to dissolve the acid salt and the cellulose ether together, a salt solution is obtained which is not usable because of coagulation of the cellulose ether. This results, among other things, from the fact that, in the single solution, the quantity by weight of acid salt advantageously should be at least equal to that of the painter's glue.

The preparation of an aqueous solution for neutralizing and pregluing surfaces of structures made from alkaline material, in which a salt of aluminum, chromium or zinc, an aqueous solution of which has an acid reaction, is dissolved together with an, at most, equal amount by weight of a water-soluble cellulose ether, is carried out in a simple manner by stirring a dry powder mixture of the salt and an, at most, equal amount by weight of a water-soluble hydroxyethyl cellulose into water. The hydroxyethyl cellulose used should have a molar degree of substitution of 1.0 to 5.0. The molar degree of substitution is the average number of hydroxyethyl groups which are attached to a glucose unit of the cellulose either directly or over one or more additional hydroxyethyl groups. A molar degree of substitution of 1.0 to 5.0 corresponds to a content of 21 to 59% by weight of etherified groups, calculated as ethylene oxide. Hydroxyethyl celluloses with a molar degree of substitution within the range of 1.5 to 2.5, corresponding to an $OC_2H_4$ content within the range of 27 to 41%, preferably are used in this process.

The hydroxyethyl cellulose used in the present invention preferably is a so-called low viscosity type, i.e., those cellulose ethers which, in 2% aqueous solutions, have viscosities of 20 to 400 centipoises at room temperature. Also, types of cellulose ethers having higher viscosities are within the scope of the present invention, e.g. types having viscosities of 2000 centipoises in 2% aqueous solutions.

The solution of the present invention is prepared in a manner such that the content of salt having an acid reaction is at least as great as the content of cellulose ether. Solutions are preferred having an amount by weight of acid salt which is three to six times the amount by weight of the cellulose ether.

Water-soluble resins may be added to the solutions of the present invention. Suitable known water-soluble resins are, for example, urea-formaldehyde resins and urea-melamine resins. The solutions also may contain plastics dispersed in water, the so-called plastic latices, e.g. dispersions of polyvinyl acetate. In the process of the invention, the solution alternatively may be prepared by stirring dry powder mixtures into water which mixtures contain, in addition to the acid salt and painter's glue, a powdered synthetic resin which is soluble or dispersible in water. The quantity by weight of the plastic present should, at most, be twice the quantity by weight of the hydroxyethyl cellulose and preferably is 5 to 10% by weight of the salt which has an acid reaction in an aqueous solution.

The novel dry material used for the preparation of the solution of the present invention comprises a dry mixture of a powdered salt of aluminum, chromium or zinc which has an acid reaction in an aqueous solution, and an, at most, equal quantity by weight of a powdered hydroxyethyl cellulose. The dry mixture of powders also may contain a powdered synthetic resin which is soluble or dispersible in water.

In the process of the present invention and in the material used in the process, more than one of the salts having an acid reaction in an aqueous solution and more than one type of cellulose may be employed. Among the salts to be used preference is given to aluminum sulfate and alum.

The process and the material of the present invention result in a simplification in neutralizing and pre-gluing walls and other structures in that at least one operation is eliminated. A further advantage of the material is that both of the components to be used together, i.e., the painter's glue and the acid salt, may be supplied to the building site in the desired weight ratio. The fact that hydroxyethyl cellulose is soluble not only in cold but also in hot water, results in a further advantage in that hot water may be used for the preparation of the solution, which results in an acceleration of the dissolving process.

The invention will be further illustrated by reference to the following examples:

EXAMPLE 1

A powdery hydroxyethyl cellulose, a 2% solution of which has a viscosity of 200 centipoises at 20° C., was mixed with five times its weight of powdery technical aluminum sulfate until uniformly distributed. This mixture completely dissolved in cold water after a short time;

when using hot water, the time of solution was even shorter.

The surface of an alkaline masonry structure was coated with this solution. After drying, the surface was sufficiently neutralized and pre-glued.

EXAMPLE 2

A powdery hydroxyethyl cellulose (200 centipoises in 2% aqueous solution) was uniformly mixed with four times its quantity by weight of powdery alum and with 0.4 times its quantity by weight of a powdered water-soluble urea-formaldehyde resin. After being dissolved in cold or hot water, the mixture was a suitable primer for neutralizing and pre-gluing alkaline masonry structures.

EXAMPLE 3

The dry mixture obtained according to the procedure of Example 1 was dissolved in eight times its quantity by weight of cold water and then mixed with 0.5 part by weight (calculated on the six parts by weight of powdery mixture) of a dispersion containing 50% by weight of a highly polymerized dispersed vinyl resin.

EXAMPLE 4

A powdery hydroxyethyl cellulose (40 centipoises in 2% aqueous solution) was uniformly mixed with four times its quantity by weight of powdered alum. The powdery mixture was dissolved in eight times its quantity by weight of hot water and, after cooling, was mixed with 2 parts by weight (calculated on the five parts by weight of powdery mixture) of a 50% vinyl resin copolymer dispersion. The solution obtained was used for pre-gluing and priming.

EXAMPLE 5

One part by weight of powdery hydroxyethyl cellulose, 5 parts by weight of aluminum sulfate, and 2 parts by weight of powdery redispersible vinyl resin, consisting of 95% by weight of vinyl acetate and 5% by weight of vinyl alcohol, were intimately mixed. The powder mixture was poured into eight times its quantity by weight of water and stirred. After about half an hour, a homogeneous solution of the salt and the cellulose ether containing the vinyl resin as a uniformly dispersed material was obtained. The dispersion was coated onto a masonry structure for neutralizing and pre-gluing it. After drying, the coated dispersion constituted a primer to which coatings and wallpapers could be applied without further intermediate treatment, which coatings and wallpapers are sensitive to alkaline supports. It was found that the original alkalinity of the surface had been sufficiently neutralized and pre-glued.

It will be obvious to those skilled in the art that many modifications may be made within the scope of the present invention without departing from the spirit thereof, and the invention includes all such modifications.

What is claimed is:

1. A process for the preparation of a solution for neutralizing and pre-gluing surfaces of structures made from alkaline building materials which comprises dissolving in water a dry powdered mixture consisting essentially of a salt of a metal selected from the group consisting of aluminum, chromium and zinc, which salt in aqueous solution has an acid reaction, and hydroxyethyl cellulose, having a molar degree of substitution of 1 to 5, the salt being present in a quantity by weight which is 3 to 6 times the weight of the hydroxyethyl cellulose.

2. A process according to claim 1 in which the dry powdered mixture contains a powdered synthetic resin in a quantity not more than twice the quantity by weight of the hydroxyethyl cellulose.

3. A process according to claim 1 in which the salt is aluminum sulfate.

4. A process according to claim 1 in which the salt is alum.

5. A dry powdered mixture consisting essentially of a salt of a metal selected from the group consisting of aluminum, chromium and zinc, which salt in aqueous solution has an acid reaction, and hydroxyethyl cellulose having a molar degree of substitution of 1 to 5, the salt being present in a quantity by weight which is 3 to 6 times the weight of the hydroxyethyl cellulose.

6. A mixture according to claim 5 containing, in addition, a powdered synthetic resin in a quantity not more than twice the quantity by weight of the hydroxyethyl cellulose.

7. A mixture according to claim 5 in which the salt is aluminum sulfate.

8. A mixture according to claim 5 in which the salt is alum.

9. A method of neutralizing and pre-gluing surfaces of structures made from alkaline building materials which comprises coating the surfaces with an aqueous solution consisting essentially of a salt of a metal selected from the group consisting of aluminum, chromium and zinc, which salt in aqueous solution has an acid reaction, and hydroxyethyl cellulose having a molar degree of substitution of 1 to 5, the salt being present in a quantity by weight which is 3 to 6 times the weight of the hydroxyethyl cellulose.

10. A method according to claim 9 in which the coating contains a powdered synthetic resin in a quantity not more than twice the quantity by weight of the hydroxyethyl cellulose.

11. A method according to claim 9 in which the salt is aluminum sulfate.

12. A method according to claim 9 in which the salt is alum.

References Cited

UNITED STATES PATENTS

| | | | |
|---|---|---|---|
| 1,151,701 | 8/1915 | Macnichol | 106—12 |
| 2,205,557 | 6/1940 | Fisher et al. | 117—73 |
| 2,570,827 | 10/1951 | Madison et al. | 106—194 |
| 2,650,173 | 8/1953 | Goulding | 117—123 |
| 3,051,590 | 8/1962 | Proux | 117—123 |
| 3,037,881 | 6/1962 | McDowell | 117—123 |
| 2,725,301 | 11/1955 | Mayer et al. | 106—197 |
| 2,909,450 | 10/1959 | Goldstein | 260—29.6 |

FOREIGN PATENTS 490,170  3/1953  Canada.

WILLIAM H. SHORT, *Primary Examiner.*

E. M. WOODBERRY, *Assistant Examiner.*